(12) United States Patent
Williams

(10) Patent No.: US 9,903,984 B1
(45) Date of Patent: Feb. 27, 2018

(54) ACHROMATIC OPTICAL-DISPERSION CORRECTED REFRACTIVE-GRADIENT INDEX OPTICAL-ELEMENT FOR IMAGING APPLICATIONS

(71) Applicant: Vadient Optics, LLC, Beaverton, OR (US)

(72) Inventor: George Williams, Portland, OR (US)

(73) Assignee: Vadient Optics, LLC, Beaverton, OR (US)

( * ) Notice: Subject to any disclaimer, the term of this patent is extended or adjusted under 35 U.S.C. 154(b) by 0 days.

(21) Appl. No.: 15/353,729

(22) Filed: Nov. 16, 2016

Related U.S. Application Data

(63) Continuation-in-part of application No. 14/599,731, filed on Jan. 19, 2015, now Pat. No. 9,644,107, which
(Continued)

(51) Int. Cl.
*G02B 13/14* (2006.01)
*G02B 3/00* (2006.01)
(Continued)

(52) U.S. Cl.
CPC .......... *G02B 3/0087* (2013.01); *C09D 11/38* (2013.01); *G02B 1/041* (2013.01); *G02B 27/0025* (2013.01)

(58) Field of Classification Search
CPC .... G02B 3/0087; G02B 13/14; G02B 13/143; G02B 3/0037; G02B 13/0045;
(Continued)

(56) References Cited

U.S. PATENT DOCUMENTS 5,498,444 A   3/1996   Hayes
5,707,684 A   1/1998   Hayes et al.
(Continued)

FOREIGN PATENT DOCUMENTS

EP   2412767 A1   2/2012
EP   2474404 A1   6/2012
(Continued)

OTHER PUBLICATIONS

Richard Chartoff, et al., Functionally Graded Polymer Matrix Nano-Composites by Solid Freeform Fabrciation: A Preliminary Report, Solid Freeform (SFF) symposium, [online], 2003, pp. 385-391, [retrieved on Apr. 23, 2015]. from the Internet: <http://sffsymposium.engr.utexas.edu/Manuscripts/2003/2003-36-Chartoff.pdf>.
(Continued)

*Primary Examiner* — Euncha Cherry

(57) ABSTRACT

An optical-dispersion corrected optical-element with a first and a second surface for imaging equal angle quadrilateral focal plane array (FPA). The optical-dispersion element comprises a first nanocomposite-ink with a first nanofiller dispersed in a cured organic-matrix and a second nanocomposite-ink with a second nanofiller dispersed in the cured organic-matrix. Optical-dispersion of the second nanocomposite-ink is different than optical-dispersion of the first nanocomposite-ink. The distribution of the first nanocomposite-ink and second nanocomposite-ink corrects chromatic aberration and creates a refractive gradient that is non-radially symmetric to correct for an image plane array.

18 Claims, 11 Drawing Sheets

Related U.S. Application Data is a continuation-in-part of application No. 14/293,574, filed on Jun. 2, 2014, now Pat. No. 9,442,344.

(60) Provisional application No. 62/013,500, filed on Jun. 17, 2014.

(51) Int. Cl.
  *C09D 11/38* (2014.01)
  *G02B 27/00* (2006.01)
  *G02B 1/04* (2006.01)

(58) Field of Classification Search
  CPC ...... G02B 27/0025; G02B 5/008; G02B 3/08; G02B 1/041; G02B 13/04; G02B 26/08; G02B 26/0833; C09D 11/38; G02F 1/3526; G02F 1/3511; G02F 1/361; B81C 1/00658; B81B 3/007; B81B 2201/042
  USPC ........................................................ 359/356
  See application file for complete search history.

(56) References Cited

U.S. PATENT DOCUMENTS

| | | |
|---|---|---|
| 5,800,000 A | 9/1998 | Shockley |
| 5,807,906 A | 9/1998 | Bonvallot et al. |
| 6,593,415 B2 | 7/2003 | Koike et al. |
| 6,656,990 B2 | 12/2003 | Shustack et al. |
| 6,805,902 B1 | 10/2004 | Hayes |
| 6,836,371 B2 | 12/2004 | Lai et al. |
| 6,934,088 B2 | 8/2005 | Lai et al. |
| 6,976,641 B2 | 12/2005 | Lai et al. |
| 7,046,439 B2 | 5/2006 | Kaminsky et al. |
| 7,420,743 B2 | 9/2008 | Lai et al. |
| 7,473,721 B2 | 1/2009 | Harada et al. |
| 7,918,555 B2 | 4/2011 | Sverdrup et al. |
| 2012/0068368 A1* | 3/2012 | Suenaga ................ G02B 1/041 264/1.7 |
| 2015/0021528 A1 | 1/2015 | Chartoff et al. |
| 2015/0023643 A1 | 1/2015 | Chartoff et al. |

FOREIGN PATENT DOCUMENTS

| | | |
|---|---|---|
| EP | 2469309 B1 | 8/2013 |
| EP | 2392473 B1 | 9/2013 |
| WO | 2012/054482 A2 | 4/2012 |

OTHER PUBLICATIONS

Richard Chartoff, et al., Polymer Matrix Nanocomposites by Inkjet Printing, Solid Freeform (SFF) symposium, [online], 2005, pp. 174-183, [retrieved on Apr. 23, 2015]. from the Internet: <http://sffsymposium.engr.utexas.edu/Manuscripts/2005/2005-16-Chartoff.pdf>.

* cited by examiner

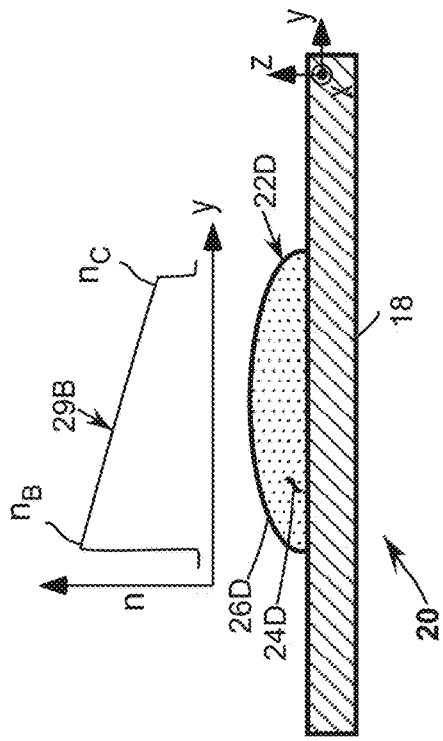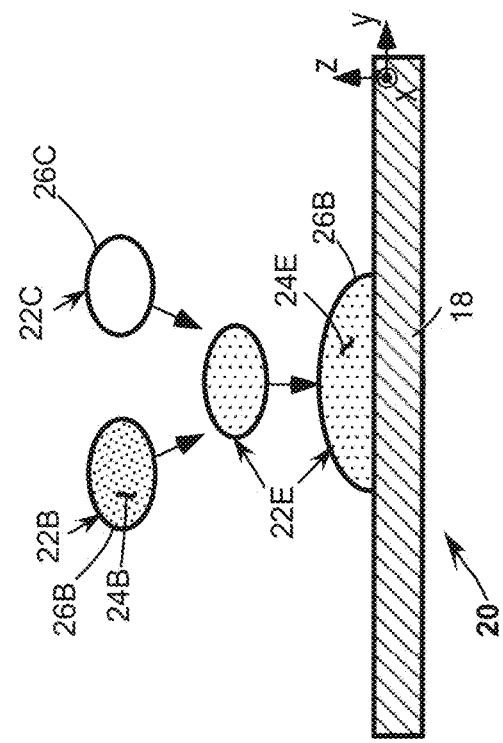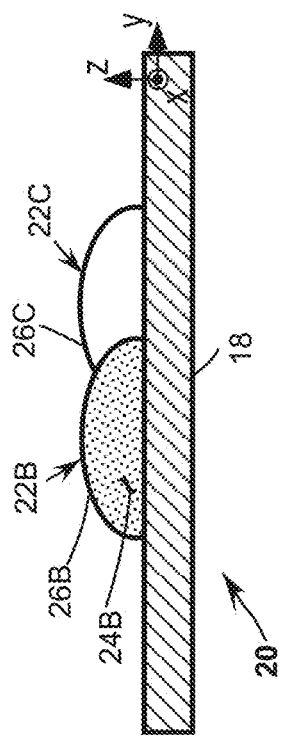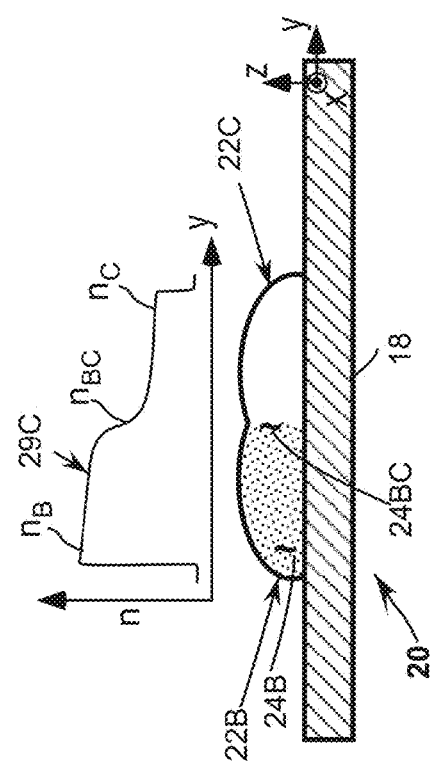

US 9,903,984 B1

ACHROMATIC OPTICAL-DISPERSION CORRECTED REFRACTIVE-GRADIENT INDEX OPTICAL-ELEMENT FOR IMAGING APPLICATIONS

REFERENCE TO RELATED PATENTS

This application is a continuation-in-part of U.S. patent application Ser. No. 14/599,731 filed Jan. 19, 2015, which is a continuation-in-part of U.S. patent application Ser. No. 14/293,574 filed Jun. 2, 2014 and also claims benefit of U.S. Provisional Patent Application No. 62/013,500 filed Jun. 17, 2014.

TECHNICAL FIELD OF THE DISCLOSURE

The present disclosure relates in general to correcting optical chromatic aberration caused by optical-dispersion in media. The disclosure relates in particular to optical-dispersion corrected refractive-gradient index (GRIN) optic for imaging onto pixelated imagers or focal plane arrays (FPA).

DISCUSSION OF BACKGROUND ART

Optical-dispersion is a well-known optical phenomenon which refers to wavelength dependency of refractive index in media. For applications such as spectroscopy, optical-dispersion can be desirable to cause wavelength separation. For imaging optics, optical-dispersion causes undesirable wavelength dependent focal shift, called chromatic aberration. A variety of solutions to reduce chromatic aberration are known in the art.

An achromatic lens provides chromatic aberration compensation by utilizing different glass types with different optical-dispersion, often crown glass and flint glass. One example of an achromatic lens is a doublet-lens. A doublet-lens consists of a positive-lens and a negative-lens, with different optical-dispersion, sandwiched together, forming a single optic. In the doublet-lens, the different optical-dispersion and lens shape reduce chromatic aberration, generally limited for focal shift correction of two wavelengths. Increased wavelength correction can be accomplished with additional lenses, air-space between lenses, and aspheric lens shape. Another correction solution utilizes gradient refractive index (GRIN) films.

One method to correct chromatic aberration with GRIN optics is by forming a lens out of a continuous GRIN material. One such method is described in U.S. Patent Publication No. US 20130003186 A1, where wavelength separation, caused by initial dispersion of light entering into a single-lens, is partially corrected by the optical-dispersion of a continuous GRIN material that form the lens.

This application relates to another approach.

SUMMARY OF THE DISCLOSURE

The present disclosure is directed to dispersion n optical-dispersion corrected optical-element with a first and a second surface for imaging equal angle quadrilateral image plane array (FPA). The optical-dispersion element comprises a first nanocomposite-ink with a first nanofiller dispersed in a cured organic-matrix and a second nanocomposite-ink with a second nanofiller dispersed in the cured organic-matrix. Optical-dispersion of the second nanocomposite-ink is different than optical-dispersion of the first nanocomposite-ink. The distribution of the first nanocomposite-ink and second nanocomposite-ink corrects chromatic aberration and creates a refractive gradient that is non-radially symmetric to correct for an image plane array.

BRIEF DESCRIPTION OF THE DRAWINGS

The accompanying drawings, which are incorporated in and constitute a part of the specification, schematically illustrate preferred embodiments of the present disclosure, and together with the general description given above and the detailed description of preferred methods and embodiment given below, serve to explain principles of the present disclosure.

FIG. 2E is a cross-section view, schematically illustrating deposition of the nanocomposite-ink side-by-side.

FIG. 2F is a cross-section view, schematically illustrating that shown in FIG. 2E, where nanocomposite-ink mixing resulted in a slow transition in the refractive-gradient profile.

FIG. 2G is a cross-section view, schematically illustrating that shown in FIG. 2E, where nanocomposite-ink mixing resulted in a fast transition in the refractive-gradient profile.

FIG. 2H is a cross-section view, schematically illustrating an mixing of nanocomposite-inks in air.

FIG. 5A is a partially-transparent perspective view, schematically illustrating that shown in FIG. 3A, wherein the GRIN Abbe-number varies radially and varies along an optical axis.

DETAILED DESCRIPTION

Figure 1A:
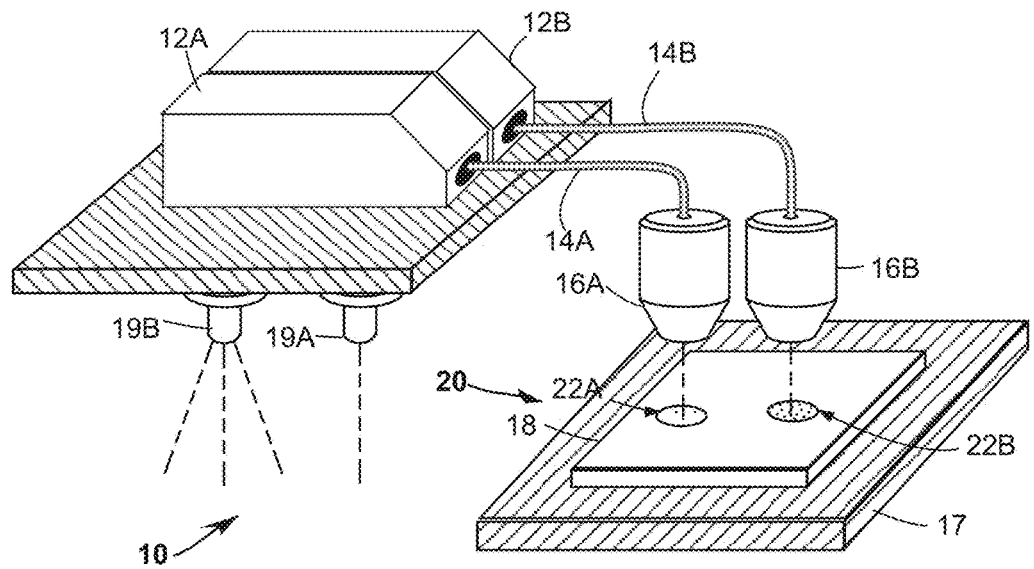
FIG. 1A is a perspective view schematically illustrating a two printer-head optical printing apparatus for manufacture of optical-elements in accordance with the present disclosure.

Referring now to the drawings, wherein like components are designated by like reference numerals. Drawings are characterized by cartesian (mutually perpendicular) axes x, y, and, z, although anyone skilled in the art can transform the axis to other coordinates or topologies. When referring to an optical-element, the z-axis refers generally to the direction of light propagation, and x and y being transverse axes. Methods of manufacture and optical-elements are described further herein below.

FIG. 1A schematically illustrates an ink-jet printing apparatus 10 for manufacture of optical-elements in accordance with the present disclosure. Printing apparatus 10 is simplified for explanatory purposes. Printing apparatus 10 of FIG. 1A has a reservoir 12A and a reservoir 12B that hold a nanocomposite-ink 22A and 22B, respectively. Reservoirs 12A and 12B provide a printing-head 16A and 16B with nanocomposite-ink 22A and 22B via a feed-line 14A and 14B, respectively. Printing-heads 16A and 16B deposit nanocomposite-ink 22A and 22B, on a substrate 18 at particular voxels, thereby forming an optical-element in-process 20. Voxels refer to positions in three-dimensional space. A Stage 17 positions substrate 18, with respect to the printing-heads, for deposition of the nanocomposite-inks at particular voxels.

Substrate 18 can be made from a variety of materials which include glasses, metals, ceramics, and organic resins. Substrate 18 can become part of the optical-element or alternatively the optical-element may be removed from the substrate. For applications in which the substrate becomes part of the optical-element, the substrate may be optically transmissive, reflective, or absorptive. For example, in applications where the optical-element is optically transmissive and the substrate becomes a part of the optical-element, it is desirable for the substrate to be optically transparent.

After deposition of the nanocomposite-ink from one of the printing-heads, substrate 18 can be positioned with respect to a radiation source 19A for selective-curing of the nanocomposite-ink, at voxels. Selective-curing refers to localized radiation about voxels, activating the organic-host matrix. Activation of the organic-host matrix solidifies the nanocomposite-ink. Selective-curing means zero-curing, partial-curing, or fully-curing, which respectively means not solidifying, partially solidifying, or fully solidifying the nanocomposite-ink. Another radiation source 19B flood cures the substrate the nanocomposite-ink on the substrate. Flood curing is desirable when the all the nanocomposite-ink needs to be partially or fully cured.

Figure 1B:
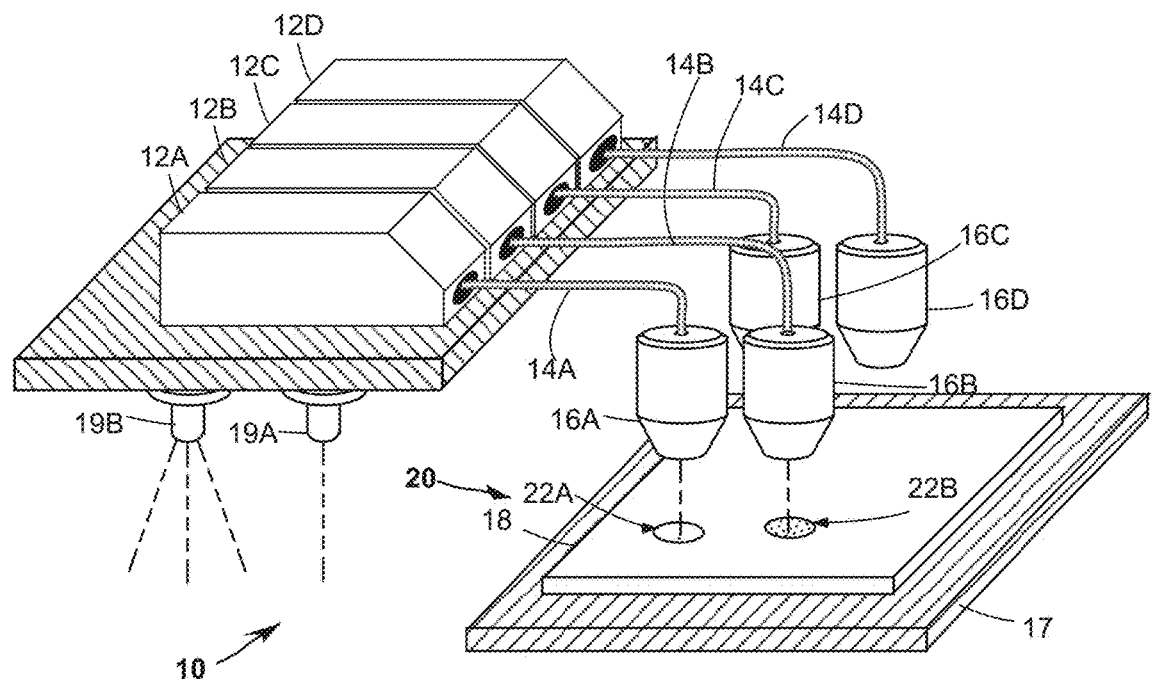
FIG. 1B is a perspective view schematically illustrating a four-head optical printing apparatus for manufacture of an optical-element in accordance with the present disclosure.

FIG. 1B illustrate printing apparatus 10 shown in FIG. 1B with an additional reservoir 12C and 12D, holding a nanocomposite-ink 22C and 22D, a feed-line 14C and 14D, and a printing head 16C and 16D. The additional printing heads provide additional nanocomposite-ink different from the nanocomposite-ink in other printing heads.

Figure 2A:
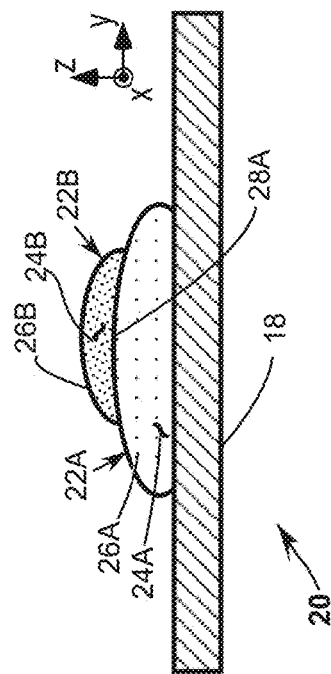
FIG. 2A is a cross-section view, schematically illustrating deposition of a first nanocomposite-ink at a voxel on a substrate in accordance with the present disclosure.

FIG. 2A schematically illustrate further detail of the optical-element in-process 20 shown in FIG. 1A. Nanocomposite-ink 22A, deposited on substrate 18 is bounded by a nanocomposite-air interface 26A. The nanocomposite-ink consists of an organic-matrix with a dispersed nanofiller 24A throughout the organic-matrix. The organic matrix is inkjet printable, optically clear, photo-curable resin. Four non-limiting examples of suitable organic-matrix material are polyacrylate, hexanediol diacrylate (HDODA), polymethyl methacrylate (PMMA), diethylene glycol diacrylate (DEGDA) and SU-8. The nanofillers are ceramic nanoparticles sufficiently small with respect to light wavelengths, for those wavelengths the optical element is intended for use, not to scatter the light. The nanocomposite-ink can be different by the nanofiller type, the organic-host matrix type, or concentration of nanofillers and combinations thereof. Non-limiting examples of nanofillers include beryllium oxide (BeO), aluminum nitride (AlO), silicon carbide (SiC), zinc oxide (ZnO), zinc sulfide (ZnS), zirconium oxide (ZrO), yttrium orthovanadate ($YVO_4$), titanium oxide ($TiO_2$), copper sulfide ($CuS_2$), cadmium selenide (CdSe), lead sulfide (PbS), molybdenum disulfide ($MoS_2$) and silicon dioxide ($SiO_2$), including those with core, core-shell, and core-shell-ligand architectures. Optical-dispersion of the nanocomposite-ink depends on the organic-matrix and the nanofillers.

Optical-dispersion is characterized by an Abbe-number ($V_d$). The Abbe-number indicates the degree of optical-dispersion, described by equation:

$$V_d = \frac{n_{yellow} - 1}{n_{blue} - n_{red}},$$

where $n_{yellow}$ is the refractive index at 587.56 nanometers (nm), $n_{blue}$ is the refractive index at 486.13 nm, and $n_{red}$ is the refractive index at 656.27 nm. A high Abbe-number indicates low optical dispersion. When referring to GRIN optics a GRIN Abbe-number ($V_{GRIN}$) is useful for describing change in the optical-dispersion within the optical-element. The GRIN Abbe-number is described by equation:

$$V_{GRIN} = \frac{\Delta n_{yellow}}{\Delta n_{blue} - \Delta n_{red}},$$

where $\Delta$ in indicates change in refractive index at the aforementioned wavelength dependent index reference points. A high GRIN Abbe-number indicates low optical dispersion through the GRIN material. The optical-dispersion of nanocomposite-ink can be tailored by combination of the organic-matrix and the nanofillers. Positive and negative values of the GRIN Abbe-number may be obtained as demonstrated by following examples herein. Combining the nanofillers BeO, and organic host Polyacrylate results in the GRIN Abbe-number of about 2244.

|  | $n_{red}$ | $n_{yellow}$ | $n_{blue}$ |
| --- | --- | --- | --- |
| Polyacrylate | 1.4995 | 1.4942 | 1.4917 |
| BeO | 1.7239 | 1.7186 | 1.7162 |
| Δ | 0.2244 | 0.2244 | 0.2245 |
| GRIN Abbe-number |  | 2244 |  |

Combining the nanofillers wurtzite w-AlN with the organic-host Polyacrylate results in the GRIN Abbe-number of about 959.

|  | $n_{red}$ | $n_{yellow}$ | $n_{blue}$ |
| --- | --- | --- | --- |
| Polyacrylate | 1.4995 | 1.4942 | 1.4917 |
| wurtzite w-AlN | 2.1730 | 2.1658 | 2.1659 |
| Δ | 0.6735 | 0.6716 | 0.6742 |
| GRIN Abbe-number |  | 959 |  |

Combining the nanofillers AlN and the organic-host SU8 results in the GRIN Abbe-number of about −356.

|  | $n_{red}$ | $n_{yellow}$ | $n_{blue}$ |
| --- | --- | --- | --- |
| SU8 | 1.5994 | 1.5849 | 1.5782 |
| AlN | 2.1704 | 2.1543 | 2.1476 |
| Δ | 0.5710 | 0.5694 | 0.5694 |
| GRIN Abbe-number |  | −356 |  |

Combining the nanofillers $ZrO_2$ and the organic-host SU8 results in the GRIN Abbe-number of about −242.

|  | $n_{red}$ | $n_{yellow}$ | $n_{blue}$ |
| --- | --- | --- | --- |
| SU8 | 1.5994 | 1.5849 | 1.5782 |
| $ZrO_2$ | 2.2272 | 2.2148 | 2.2034 |
| Δ | 0.6278 | 0.6299 | 0.6252 |
| GRIN Abbe-number |  | −242 |  |

Those skilled in the art will recognize that the exact GRIN Abbe-number will vary dependent on the material and variability in the material manufacture processes. The aforementioned Abbe-number and the GRIN Abbe-number use three wavelength reference points in the visible spectrum, but other wavelength reference points may be chosen for applications in other spectrum, those wavelength reference points being in the correct order from short-wavelength to long-wavelength. For instance, in near-IR applications 800 nm, 900 nm and 1000 nm could replace wavelength references $n_{blue}$, $n_{yellow}$, and $n_{red}$, respectively. Additionally partial dispersion of materials will affect the choice the organic-matrix and nanoparticles. The partial dispersion of a material is characterized by a rate of change of the refractive-index as a function of wavelength.

Figure 2B:
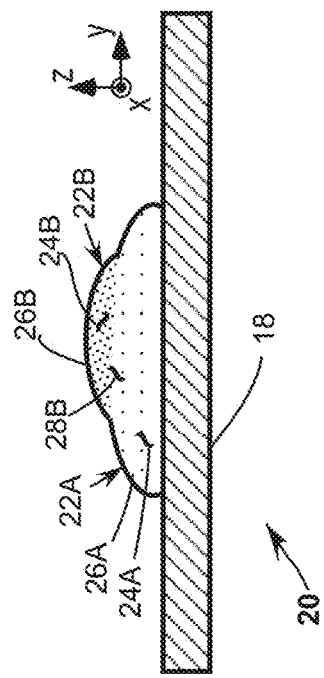
FIG. 2B is a cross-section view, schematically illustrating that shown in FIG. 2A, further including a second nanocomposite-ink deposit.

FIG. 2B schematically illustrate further detail of optical-element in-process 20 shown in FIG. 2A with additional deposit of nanocomposite-ink 22B at a voxel above the voxel of nanocomposite-ink 22A. Here, nanocomposite-ink 22B is shown after deposition, characterized by a dispersed nanofillers 24B, an ink-ink interface 28A (where mixing between nanoparticle-inks has not yet occurred), and an air-ink interface 26B.

Figure 2C:
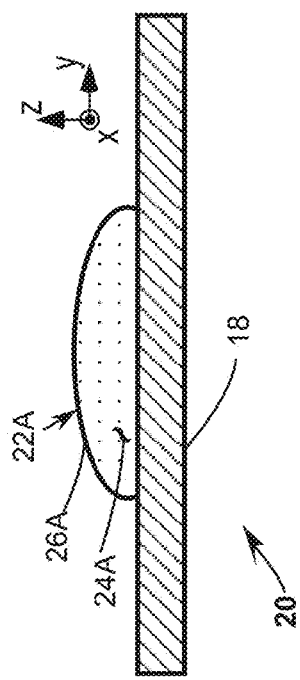
FIG. 2C is a cross-section view, schematically illustrating a resultant nanocomposite from the diffusion or convective mixing of nanofillers from the first and the second nanocomposite-ink as shown in FIG. 2B.

FIG. 2C schematically illustrates the optical-element in-process 20 as that shown in FIG. 2B, wherein the selective-curing of nanocomposite-ink 22A before deposition of nanocomposite-ink 22B was zero-curing. A nanocomposite-ink 30 is the resultant mixture of uncured nanocomposite 22A and 22B. Nanocomposite-ink 30 is characterized by air-ink interface 32 and nanofillers 24A and 24B dispersed within. A refractive-gradient between the top and bottom of nanocomposite-ink 30 depends on convective mixing resulting from relative size, velocities, and nanofiller concentrations between the nanocomposite-inks, any partial-curing of nanocomposite-ink 22A drop before deposition of nanocomposite-ink 22B, the temperature of the substrate, and time allowed for diffusion of nanofillers from nanocomposite-inks 22A and 22B, before additional partial-curing of the nanocomposite-inks.

Figure 2D:
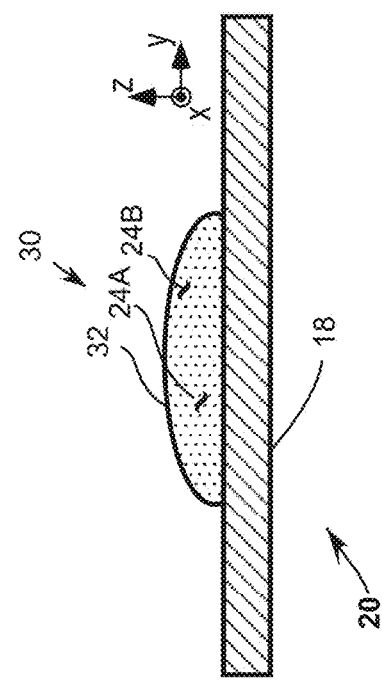
FIG. 2D is a cross-section view, schematically illustrating a resultant refractive-gradient between the first nanocomposite-ink and second nanocomposite-ink from diffusion of nanofillers of the first and second nanocomposite-inks, where the first nanocomposite was partially cured before deposition of the second nanocomposite.

FIG. 2D schematically illustrates optical-element in-process 20 as that shown in FIG. 2B wherein nanocomposite 22A was partially cured. Here, partial-cure of nanocomposite 22A results in gradient-area 28B between nanocomposite 22A and 22B. The extent of gradient-area 28B depends on the selective-cure of nanocomposite-ink 22A. Zero-curing allows mixture of the nanocomposite-inks as exemplified in FIG. 2C. Partial-curing allows diffusion in a limited gradient area 28A as exemplified in FIG. 2D. Fully-curing allows little diffusion and results in a substantially ink-ink interface 28A as exemplified in FIG. 2B. In addition to controlling gradient-areas, partial-curing before subsequent deposition reduces stress and strain in the resultant optical-element.

FIG. 2E schematically illustrates optical-element in-process 20 shown in FIG. 1A where the nanocomposite-ink is deposited side-by-side. Here, nanocomposite-ink 22B with nanofillers 24B and ink-air interface 26B is deposited along the side of a nanocomposite-ink 22C. Nanocomposite-ink 22C has no nanofillers bound by an air-interface 26C.

FIG. 2F schematically illustrates optical-element in-process 20 as shown in FIG. 2E, where nanocomposite-ink 22B has mixed with nanocomposite 22C resulting in a gradient nanocomposite 22D. Here, nanocomposite 22D, bound by an ink-air interface 26D, has a nanofiller 24D, the same nanofillers as nanocomposite-ink 22B distributed in a refractive-gradient profile 29B. The gradient is a result of mixture of the nanocomposites where the partial-curing of nanocomposite 22B was minimal and aforementioned convective mixing and time was allowed before further partial-curing. Refractive-gradient profile 29B is characterized by high refractive-index $n_B$, the high refractive-index due to higher concentration of nanoparticles 24D, the refractive-gradient's refractive-index slowly and smoothly transitioning in the y-direction to low refractive-index $n_C$, the low refractive-index due to the low concentration of nanoparticles 24D.

FIG. 2G schematically illustrates optical-element in-process 20 as shown in FIG. 2E, where nanocomposite-ink 22B has been partially-cured before deposition of nanocomposite-ink 22C. Here partial-cure of nanocomposite-ink 22B, results in limited mixing of nanocomposite-ink 22C at an interface 24AB, resulting in a refractive-gradient 29C. Refractive-gradient profile 29C is characterized by high refractive-index $n_B$, the high refractive-index due to higher concentration of nanoparticles 24D, the refractive-gradient's refractive-index unchanging in the y-direction until quickly transitioning to low refractive index $n_B$ at former interface 24AB. Alternatively, refractive-gradient profile 29C could be obtained without partial-curing of nanocomposite-ink 22B before deposition of nanocomposite 22C, by limiting the aforementioned mixing factors, such as controlling nanocomposite-ink deposition velocities, and limiting diffusion temperature control of the substrate, and curing the deposited nanocomposite-inks within a controlled time.

FIG. 2H schematically illustrates another nanocomposite-ink mixing method. Nanocomposite-ink 26B and nanocomposite-ink 26C are deposited such that the respective printing heads are aligned to cause the nanocomposite-ink to mix in air creating a nanocomposite-ink 22E. Nanocomposite-ink 22E, then deposits, mixed, onto substrate 18 with nanofillers 24E bounded by ink-air interface 26B.

Figure 3A:
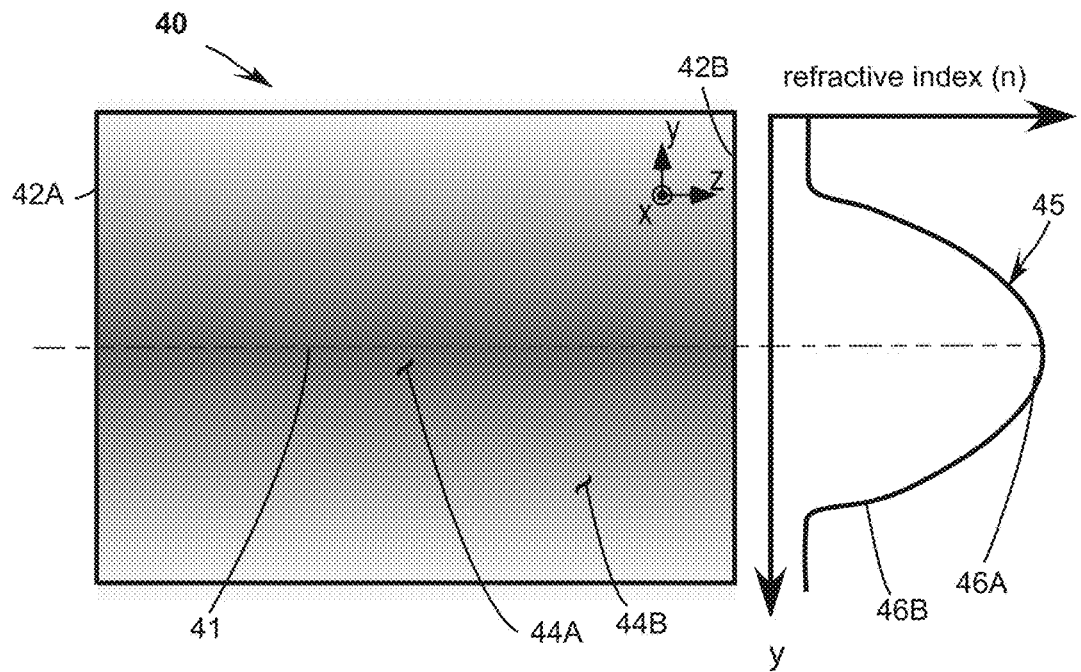
FIG. 3A is a cross-section view, schematically illustrating the refractive gradient of an optical-element of one preferred embodiment in accordance with the present disclosure, including a first nanocomposite-ink, the first nanocomposite-ink comprising of nanofillers dispersed in a cured organic-matrix, and second nanocomposite-ink, the second nanocomposite-ink comprising nanofillers dispersed in a cured organic-matrix, optical-dispersion of the second nanocomposite-ink different than dispersion of the first nanocomposite-ink, wherein the distribution of the first nanocomposite-ink and second nanocomposite-ink result in dispersion gradients, the dispersion gradients compensating chromatic aberration.

FIG. 3A schematically illustrates an optical-dispersion corrected optical-element 40 manufactured with the printing apparatus. Optical-element 40 is a positive gradient index lens (GRIN) characterized by an optical axis 41, an air-element interface 42A and an element-air interface 42B. Optical-element 40 has a higher nanofillers concentration 44A along the optical axis and a lower concentration 44B forming a refractive-gradient. Here, the refractive gradient is characterized by a hyperparabolic index profile 45, highest concentration of the nanofillers being along optical axis 41. Those skilled in the art will recognize the general design as the "wood lens." Deposition of the nanocomposite-ink forming the optical-element allows other refractive-gradient profiles including spherical, parabolic, axial, tapered, asymmetric, or otherwise graded profiles in one, two, or three axis, including profiles generated in other coordinate transforms, such as angular. Further, the refractive-gradient profile may change from those profiles aforementioned to other profiles aforementioned along any axis.

Figure 3B:
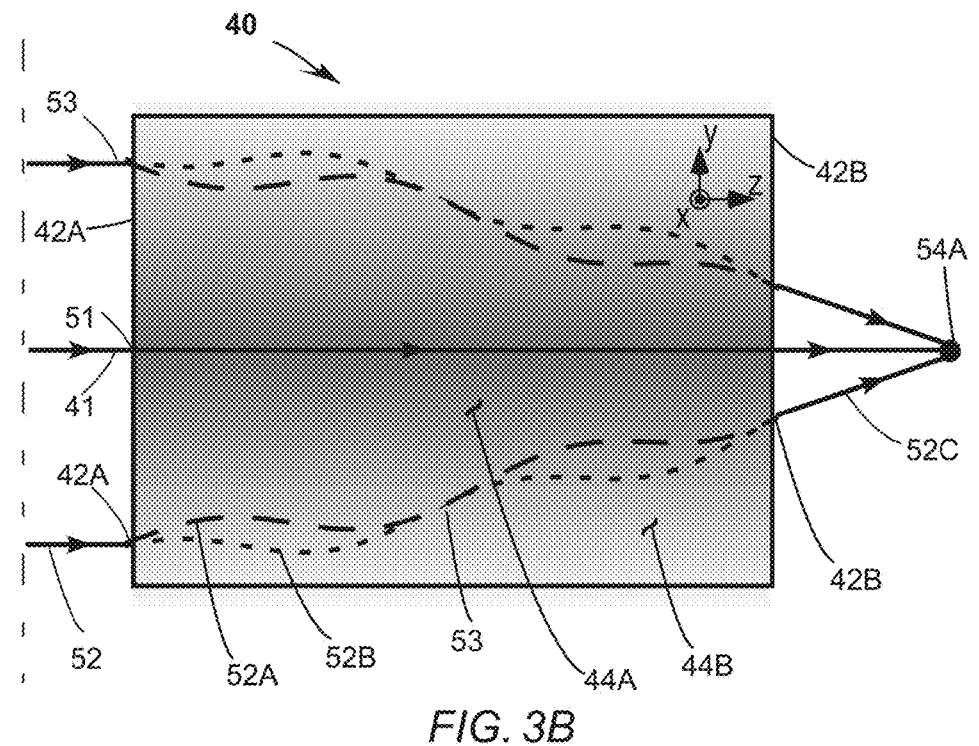
FIG. 3B is a cross-section view, schematically illustrating that shown in FIG. 3A further including exemplary rays.

FIG. 3B schematically illustrates the optical-element 40 of that shown in FIG. 3A with additional exemplary light-rays 51, 52, and 53. Light-rays 51 consists of at least two different wavelengths and enters optical-element 40 at air-element interface 42A along optical-axis 41 at zero degree angle-of-incidence, the optical-element having a symmetric refractive gradient about the optical-axis, whereby a light-ray 51, consisting of at least two different wavelengths, refracts into the nanocomposite-ink according to snell's, law, $$n_1(\lambda)\sin(\theta_1)=n_2(\lambda)\sin(\theta_2),$$

where, $n_1(\lambda)$ is the wavelength dependent refractive-index of a first medium, $\theta_1$ is the incoming angle-of-incidence normal to a second medium, $n_2(\lambda)$ is the wavelength dependent refractive-index of the second medium, and $\theta_2$ is the angle entering the second medium. Here, the first medium is air, the incoming angle-of-incidence is zero, the second medium is nanocomposite-ink and the angle entering the second medium is zero, resulting in no optical-dispersion of light-ray 51.

A light ray 52, consisting of at least two different wavelengths enters optical-element 40 at air-element interface 42A, at zero degree angle-of-incidence, experiencing optical dispersion due to a transverse refractive gradient of the optical-element with a positive GRIN Abbe-number. The optical-dispersion of light ray 52 causes beam separation, exemplified by a short wavelength 52A (short-ray) and a long wavelength ray 52B (long-ray). One skilled in the art will recognize ray separation is dramatized for explanatory purposes.

Short-ray 52A and long-ray 52B propagate through the optical-element, the GRIN Abbe-number changes smoothly from positive to negative, thereby reducing the refraction of the short-beam, while increasing refraction of the long-beam resulting in recombination of beams at a point 53. The change in the optical-element's GRIN Abbe-number, from negative to positive, causes increased refraction of the short-beam and reduced refraction of the long-beam, resulting in beam-separation. The optical-element's GRIN Abbe-number changes again from positive to negative resulting in aforementioned beam recombination at element-air interface 42B. The angle-of-incidence on an interface 42B is such that the refraction at the interface results in the short-ray and the long-ray exiting optical-element 40 at about a same angle, co-propagating towards a focal point 54A, thereby experiencing about no focal shift.

Although only two rays are shown, one skilled in the art will recognize that additional wavelengths can be corrected by the aforementioned technique as well as continuous bands of wavelengths otherwise known as broadband. The change in the GRIN Abbe-number does not necessarily align with beam separation and change in the GRIN Abbe-number can occur resulting in no beam overlap until the element-air exit interface. The GRIN Abbe-number need not be a smooth function, nor sinusoidal as shown. Likewise, beam overlap may occur multiple times across multiple wavelengths within the optical-element. The GRIN Abbe-number is spatially dependent on incoming rays and will experience different values dependent on the angle entering the optical-element and entrance location.

Figure 3C:
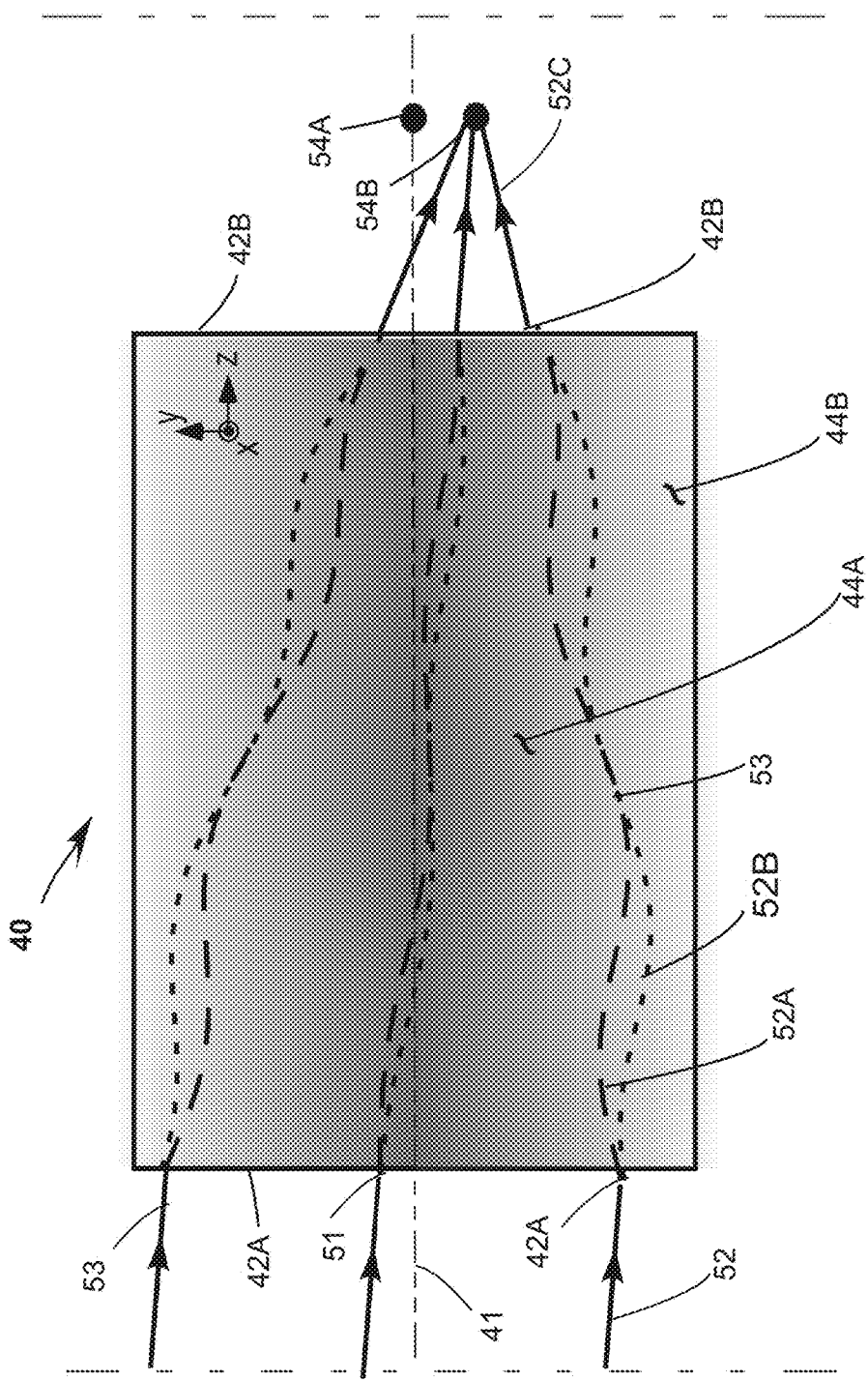
FIG. 3C is a cross-section view, schematically illustrating that shown in FIG. 3B, where the exemplary rays approach the optical-element at angle.

FIG. 3C schematically illustrates that shown in FIG. 3B, wherein light-rays 51, 52, and 53 approach at an angle-of-incidence not parallel to optical-axis 41 resulting in an off-axis focal position 54B. The off-axis focal position 54B in a plane transverse to the optical-axis 41, the plane also containing focal point 54A.

FIG. 3B details correction of axial chromatic-aberration. Axial chromatic aberration is characterized by focus shift of different wavelength along the optical-axis. FIG. 3C details correction of transverse chromatic-aberration. Transverse chromatic-aberration is characterized by focus shift of different wavelength in the focal plane. In addition to chromatic-aberration correction, the optical-element can correct geometric-aberrations.

Some nonlimiting geometric-aberrations include spherical aberration, coma, astigmatism, curvature of field, and distortion, known as Seidel aberrations. Spherical aberration is characterized by on-axis defocus. Coma is characterized by defocus of off-axis field-points. Astigmatism is characterized by asymmetric power in transverse planes to the optical-axis. Curvature of field is characterized by focus on a curved surface rather than a preferred planar surface. Distortion is characterized by nonlinear power as function of distance from the optical-axis, resulting in pincushion or barrel distortion. As aforementioned, the disclosed technique allows for complex refractive-gradient profiles which can correct for, in addition to chromatic aberration, those geometric-aberrations listed and combinations thereof. Further, geometric-aberrations of the substrate of the optical-element can be measured, before deposition of nanocomposite-ink, and corrected in the final optical-element by altering the gradient-index of the optical-element to correct for the geometric-aberrations measured.

A variety of techniques can be used to measure geometric-aberration. For a constant refractive-index optic, geometric-aberration can be determined with knowledge of the optic surfaces and material. The material of the optic is generally known or can be determined. Inexpensive methods include reflective and transmission spectrometry or refractometry, which are well known techniques in the art. Detailed element material analysis can be accomplished with scanning electron microscopy, x-ray spectrometry, and other advanced techniques. Surface properties can be measured using interferometry, profilometery, and other related techniques. Instruments capable of measuring those geometric aberrations aforementioned as well as others are commercially available from optical metrology companies such as ZYGO Corporation, of Middlefield, Conn.

Figure 4A:
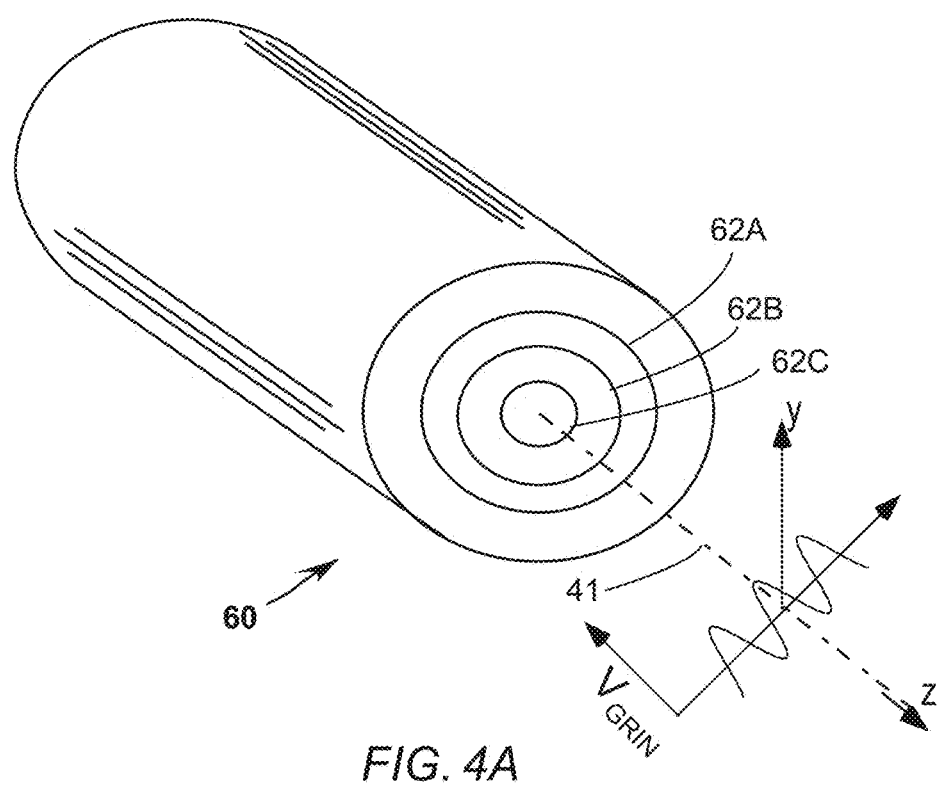
FIG. 4A is a perspective view, schematically illustrating that shown in FIG. 3A, wherein the gradient-index (GRIN) Abbe-number varies radially from an optical-axis.
Figure 4B:
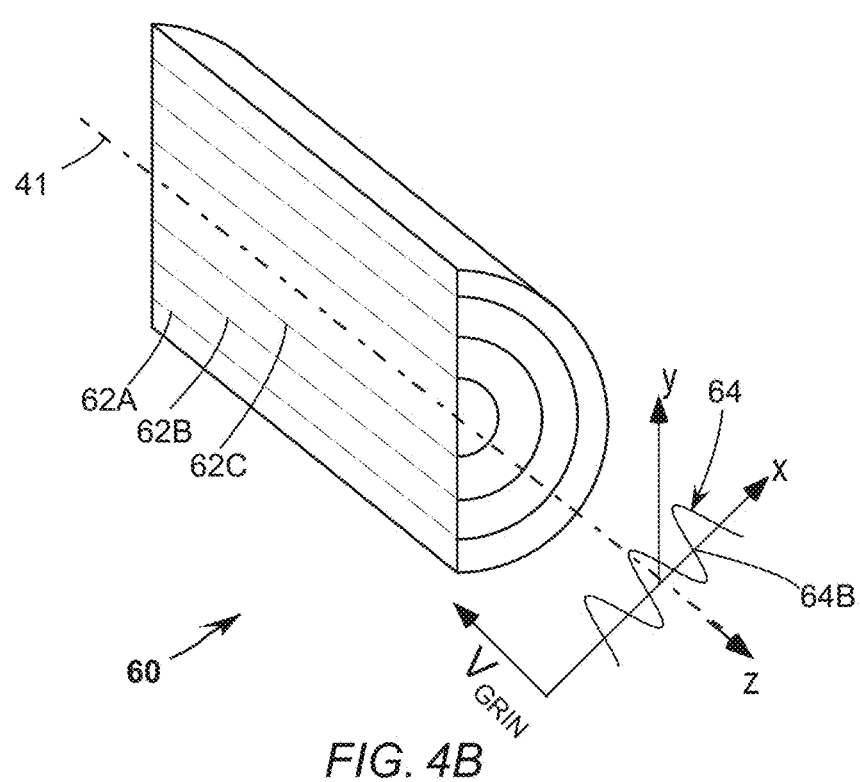
FIG. 4B is a cross-section view, schematically illustrating further detail of that shown in FIG. 4A.

FIG. 4A and FIG. 4B schematically illustrate another preferred embodiment of the present disclosure. An optical-element 60 is a GRIN optic with a parabolic GRIN profile like that shown generally in FIG. 3A. Here, the optical-element has nanocomposite deposited such that the GRIN Abbe-number changes radially from optical axis 41 along symmetric cylindrical according to an exemplary GRIN Abbe-number profile 64. GRIN Abbe-number profile 64 has an inflection point 62A, 62B, and 62C thereby correcting beam separation caused by optical-dispersion.

Figure 5B:
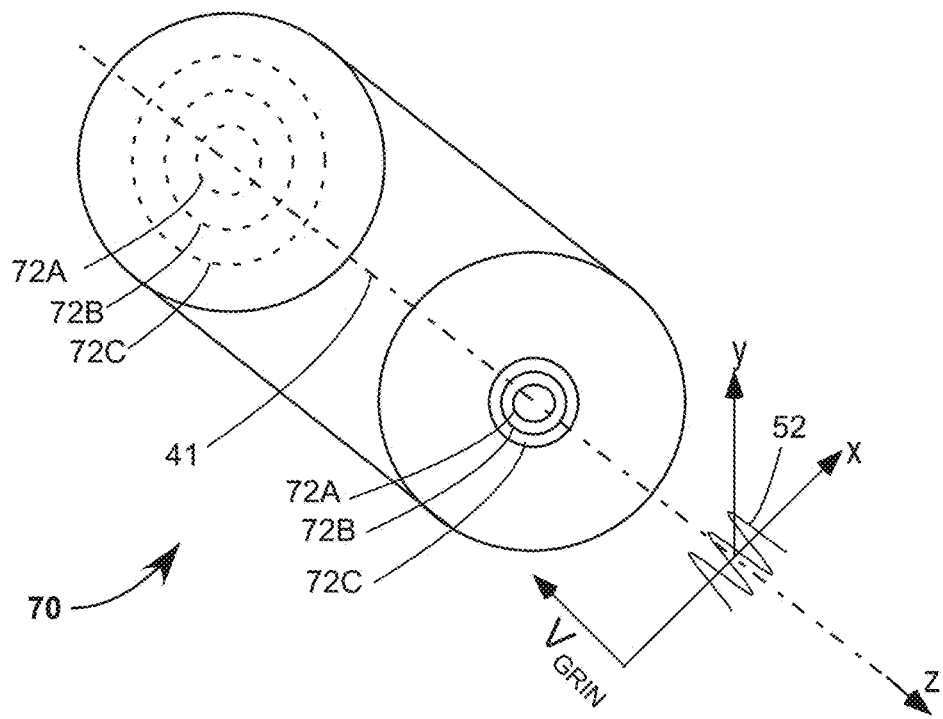
FIG. 5B is a perspective view, partly in cross-section, schematically illustrating further detail of that shown in FIG. 5A.
Figure 5B:
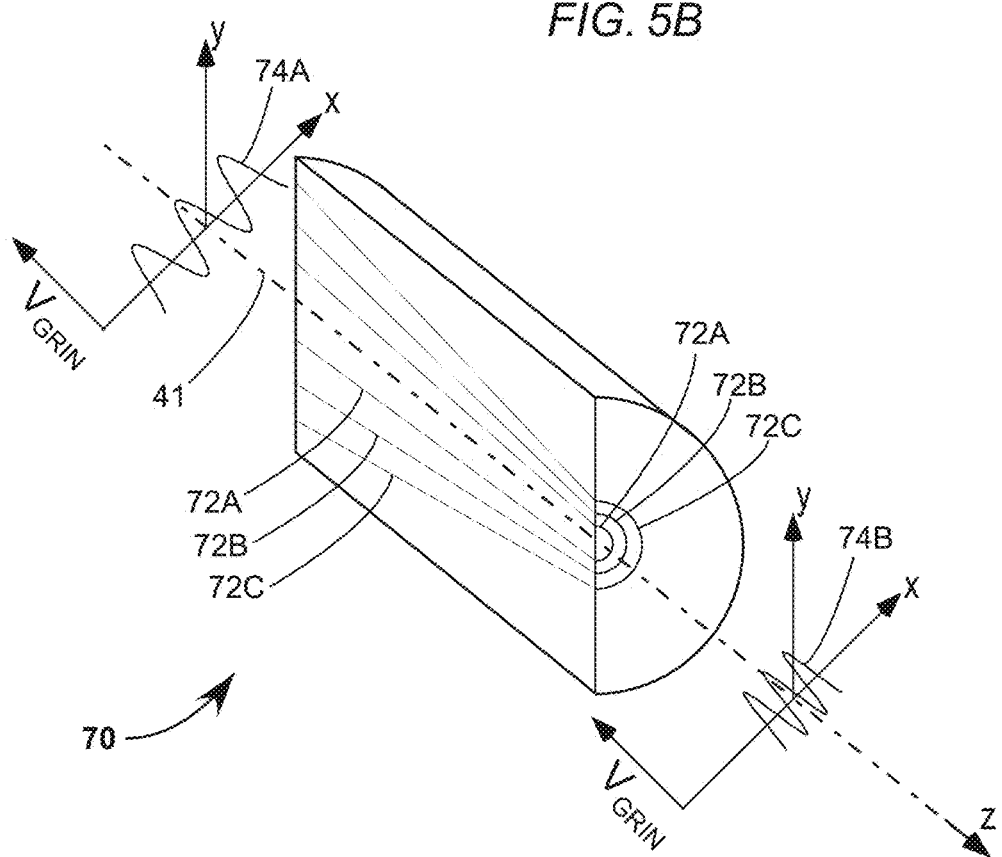

FIG. 5A and FIG. 5B schematically illustrate yet another preferred embodiment of the present disclosure. An optical-element 70 is a GRIN optic with a parabolic profile like that shown generally in FIG. 3A. Here, optical-element 70 has nanocomposite deposited such the GRIN Abbe-number changes radially from optical axis 41 and varies along optical axis. A GRIN Abbe-number profile 74A at air-element interface 76A has an inflection points 72A, 72B, and 72C. The Abbe-number profile changes through the optical-element resulting in GRIN a Abbe-number profile 74B.

Figure 6A:
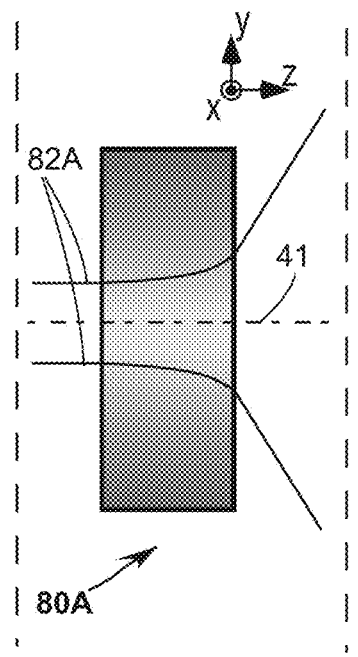
FIG. 6A is a cross-section view, schematically illustrating another embodiment of the present disclosure, where the optical-element is has negative power.
Figure 6B:
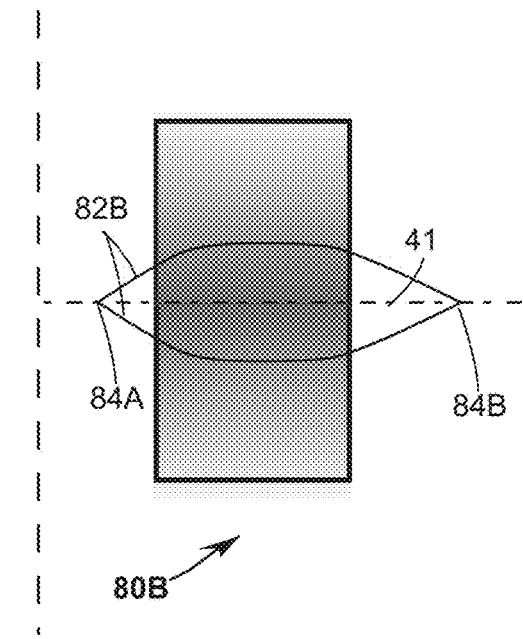
FIG. 6B is a cross-section view, schematically illustrating another embodiment of the present disclosure, where the optical-element is an imaging optic.
Figure 6C:
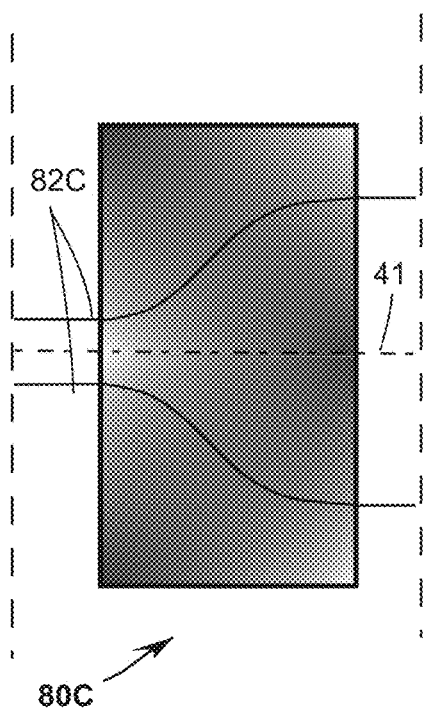
FIG. 6C is a cross-section view, schematically illustrating another embodiment of the present disclosure where the optical element is a beam-expander.
Figure 6D:
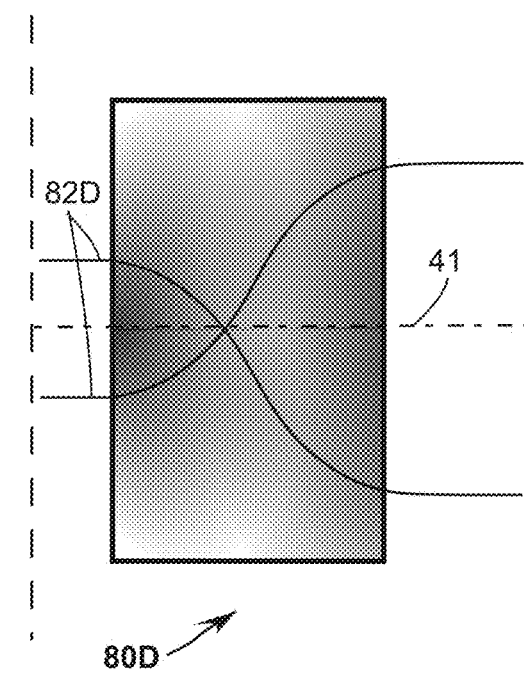
FIG. 6D is a cross-section view, schematically illustrating another beam expanding optical-element in accordance with the present disclosure.

FIG. 6A, FIG. 6B, FIG. 6C and FIG. 6D schematically illustrate other preferred embodiments of the present disclosure wherein darker shaded areas represent higher refractive index of the optical-element. In each of FIGS. 6A-6D the techniques aforementioned, or combinations thereof, can be implemented. FIG. 6A schematically illustrate an optical-element 80A where the optical power is negative, causing an incoming beam 82A to diverge from an optical axis 41. FIG. 6B schematically illustrates an imaging optical-element 80B, where a field-point 84A is imaged to a image-point 84B. FIG. 6C schematically illustrate an optical-element 80C, where the optical power changes from negative to positive along the optical axis 41, causing an incoming collimated beam 82C to diverge then converge such that it exits optical-element 80A expanded and collimated. FIG. 6D schematically illustrate an optical-element 80D, where positive optical power varies in along optical-axis 41, causing an incoming beam 82D to focus within the optical-element and then diverge and expand, finally exiting optical-element 80D expanded and collimated.

Figure 7A:
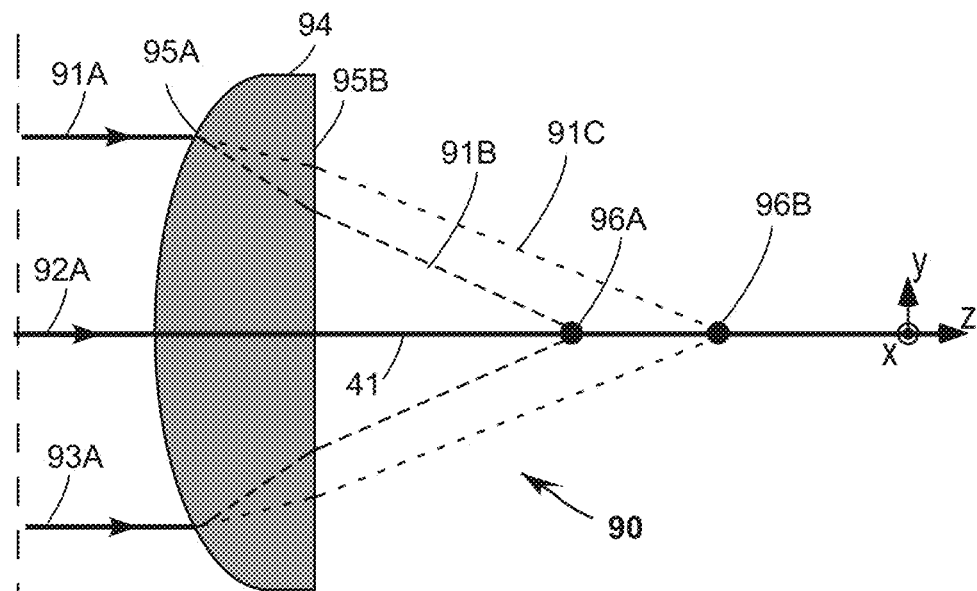
FIG. 7A is a cross-section view, schematically illustrating an optical system with chromatic aberration.

FIG. 7A schematically illustrates an optical-system 90A with chromatic aberration. Optical-system 90 has a light ray 91A, 92A, and 93A propagating toward a plano-convex lens 94, the plano-convex lens made of glass. Light-rays 92A, consisting of at least two different wavelengths, enters plano-convex lens 94 at an air-glass interface 95A along optical-axis 41 at zero degree angle-of-incidence, whereby light-ray 92A experiences no optical-dispersion. Light-ray 91A and 93A, symmetric about optical-axis 41, experience the same optical effects, light-ray 91A explained in detail herein. Light-ray 91A, consisting of at least two different wavelengths, enters optical element 94 at air-glass interference 95A at an angle-of incidence due to the convex lens shape of lens 94. Light-ray 91A experiences chromatic aberrations due to the optical-dispersion of the glass, exemplified by a short-wavelength ray 91B (short-ray) refracting towards the optical-axis more than a long-wavelength ray 91C (long-ray). Short-ray 91B and long-ray 91C propagate through the glass to glass-air interface 95B, where refraction occurs again, resulting in short-ray 91B focusing on optical-axis 41 at a point 96A and long-ray 91C focusing on optical-axis 41 at a point 96B.

Figure 7B:
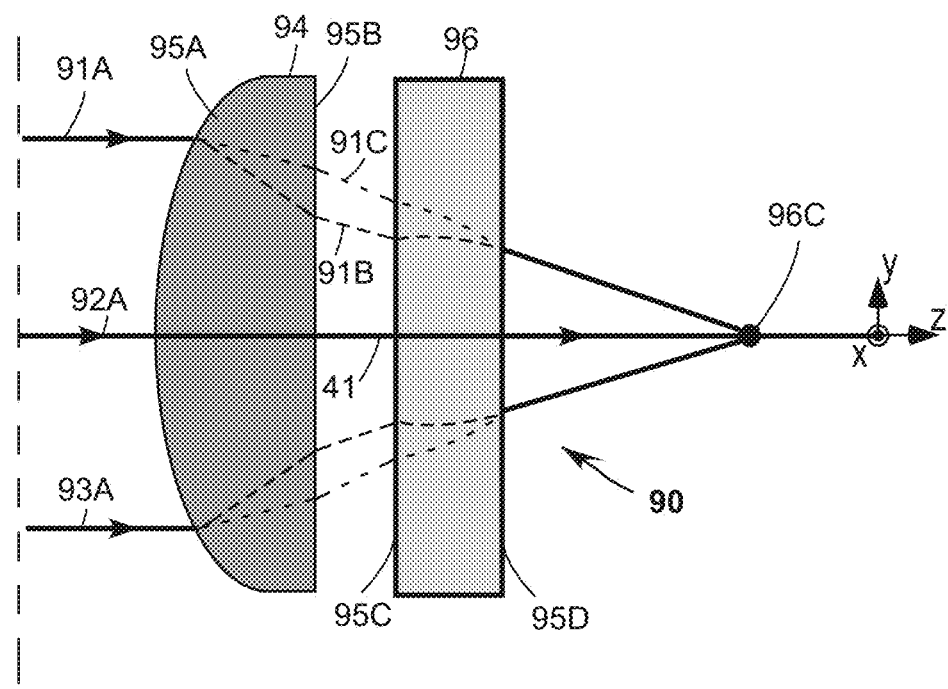
FIG. 7B is a cross-section view, schematically illustrating that shown in FIG. 7A with the addition of another embodiment in accordance with the present disclosure, where the optical-element corrects chromatic aberration of the optical system.

FIG. 7B schematically illustrate the optical system shown in FIG. 7A with the addition of an optical-element 96, in accordance with the present disclosure, positioned after plano-convex lens 94. Short-ray 91B and long-ray 91C enter optical element 96 at a air-element interface 95C, experiencing refraction into optical-element 96. The optical-element comprises of at least two nanocomposite-inks, whereby the distribution of the nanocomposite-inks, using aforementioned techniques, direct short-ray and long-ray towards an element-air interface 95D at an angle such that refraction at the interface 95D results in short-ray 91B and long-ray 91C exit optical-element 96 overlapping and co-propagating towards an overlapping point 96C, thereby correcting the chromatic aberration of optical system 90.

While this shows one particular example, other positions and other optical systems can be corrected. For example, the optical-element may be positioned before plano-convex lens 94 correcting for later experienced chromatic-aberration. Alternatively other optical systems that consist of lenses, mirrors, fibers, diffractive-optics, other optical components, the optical-element disclosed, and combinations thereof can be corrected with the optical-element in accordance with the present disclosure.

Figure 8A:
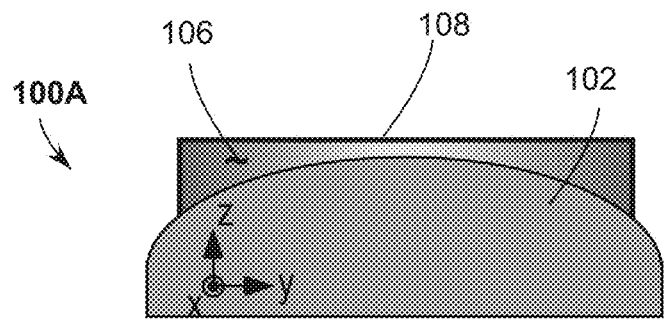
FIG. 8A is a cross section view, schematically illustrating another embodiment in accordance with the present disclosure wherein the substrate is an optic.

FIG. 8A is a cross section view, schematically illustrating an optical-element 100A. Optical-element 100A has a substrate 102, where the substrate is a plano-convex optic made of glass. The nanocomposite-ink is deposited to form the refractive-gradients of a bulk nanocomposite 104 with a nanofiller 106, correcting chromatic-aberrations and geometric aberrations of the plano-convex optic. An element-air interface 108 is shown planar, but can be printed in a manner to be conformal to the underlying substrate or other geometries.

Figure 8B:
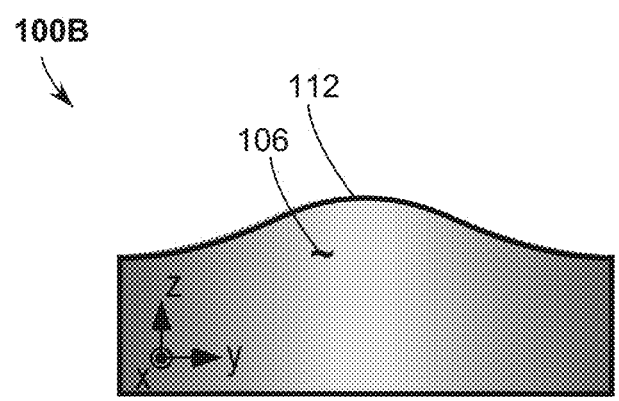
FIG. 8B is a cross-section view, schematically illustrating another embodiment in accordance with the present disclosure, wherein the optical-element is shaped after deposition.

FIG. 8B is a cross-section view, schematically illustrating a shaped optical-element 100B wherein optical-element 100B is shaped after deposition. Nanocomposite-ink is first deposited, then partially removed by methods such as single point diamond turning or chemical mechanically polishing, or solvent based removal of uncured polymers, forming an air-element interface 112, where the interface has curvature. The remaining nanocomposite-ink and nanofillers 106, structured using aforementioned techniques, correcting chromatic-aberrations and geometric-aberrations.

Figure 8C:
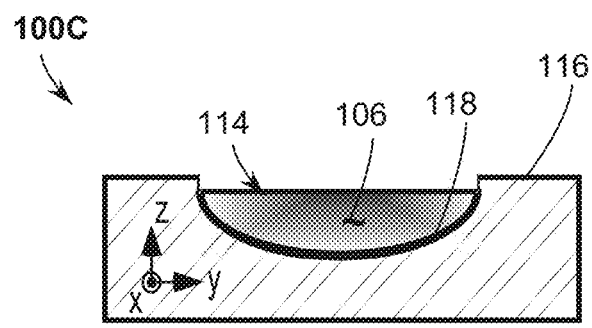
FIG. 8C is a cross-section view, schematically illustrating another embodiment in accordance with the present disclosure, wherein the optical-element is printed in a mold.

FIG. 8C is a cross-section view, schematically illustrates a mold for printing an optical-element 114. Here the mold is the substrate and has curvature at a nanocomposite-mold interface 118, causing nanocomposite-ink to conform to the mold curvature, resulting in optical-element 114 retaining the curvature of the mold interface upon removal. The nanocomposite-ink and nanofillers 106, are structured using aforementioned techniques, correcting chromatic-aberrations and geometric-aberrations of the resultant optical element.

Figure 9A:
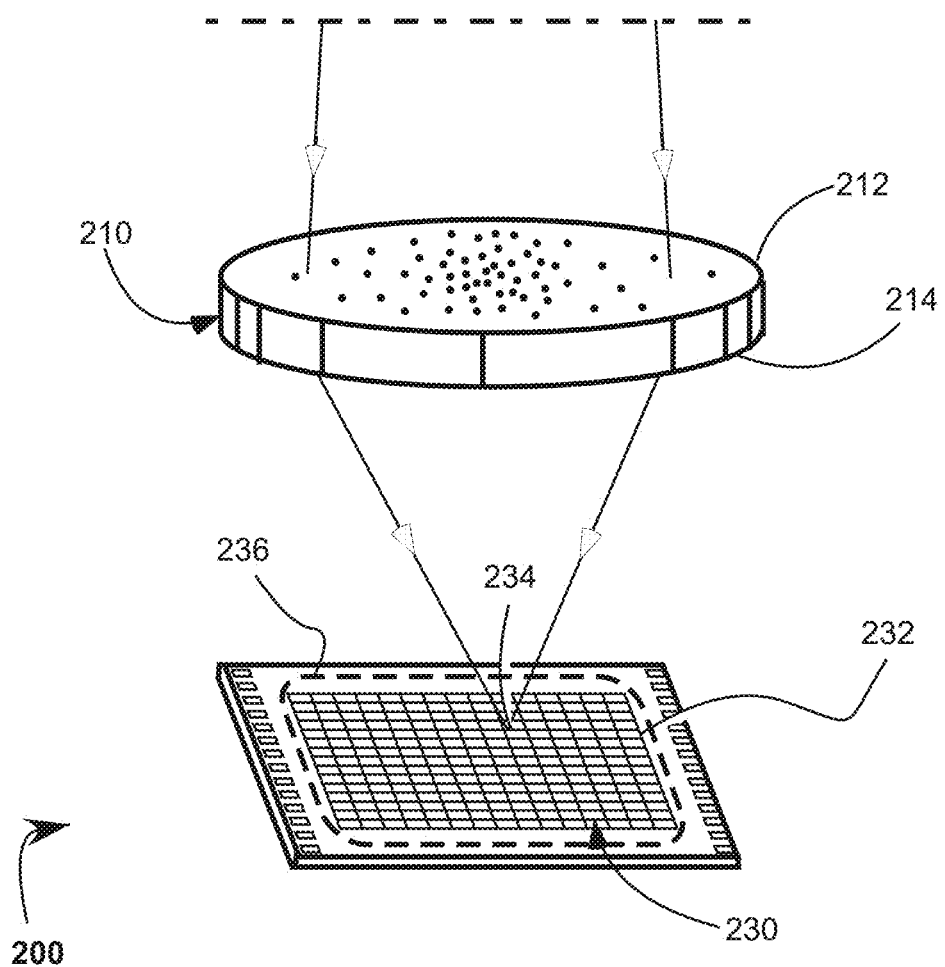
FIG. 9A is a cross-section view illustrating an chromatic corrected optical-element with a field-of-view matching an image sensor aspect ratio.

FIG. 9A is a perspective view of an imaging system 200. Imaging system 200 has an optical-dispersion corrected optical-element 210 for imaging onto an image sensor 230 and more particularly an image plane array 232. The optical-dispersion element has with a first surface 212 and a second surface 214 with a first nanocomposite-ink with a first nanofiller dispersed in a cured organic-matrix and a second nanocomposite-ink with a second nanofiller dispersed in the cured organic-matrix. Optical-dispersion of the second nanocomposite-ink is different than optical-dispersion of the first nanocomposite-ink. The distribution of the first nanocomposite-ink and second nanocomposite-ink corrects chromatic aberration and creates a volumetric cross-section with a radially asymmetric refractive gradient to correct optical aberration within the aspect ratio of an image plane array.

Image sensors or more particularly image plane arrays are also referred to in the art as camera sensors, focal plane arrays (FPA), pixelated detectors and other such terms. The optical-element of the present disclosure applies to all such sensors wherein pixels are non-radially symmetric. A typical image plane array, such as image plane array 230, is an equal-angle quadrilateral, i.e. a square or a rectangle. Such image plane arrays typically have aspect ratios (length:width) that are 1:1, 4:3, or 16:9, although other aspect rations exist and the optical-element can be designed to accommodate other aspect ratios. Here, image sensor 230 has image plane array 232 with an aspect ratio of about 3:2. Typical imaging systems have an f-number of about f/1.4, f/2, f/4, or f/8 although larger and smaller f-numbers can be accommodated.

The radially asymmetric cross-section corrects optical aberration by optimizing imaging within a field-of-view 236 that is about matched to the aspect ratio of the image plane array. As described above, the concentration of nanoparticles within any volumetric are determine the local refractive index. The concentration of nanoparticles, or the proportional index of refraction, of the radially asymmetric refractive gradient can be described by high order mutually orthogonal cross terms or any other such freeform equations. The ABBE number and GRIN Abbe number compensation can be implemented as described above.

In some embodiments, the cross-section of the entire optical-element has the radially asymmetric refractive gradient and the overall asymmetry of the radially asymmetric refractive gradient is optimized for imaging within the image sensor. In other embodiments, a smaller volumetric cross-section is used and the radially asymmetric refractive gradient has a higher asymmetry to compensate for radially symmetric cross-sections. In yet other embodiments, a plurality of cross-section have radially asymmetric refractive gradients and can include distinct or continuously changing radially asymmetric refractive gradients along the optical axis.

The first surface, the second surface, or both can have surface curvature. The surface curvature can be radially symmetric or asymmetric, including freeform. Using inkjet printing, the shape of the lens can be arbitrarily chosen and can include circular, square, rectangular, including segmented pieces and annular shapes with center of mass located on or off-axis.

From the description of the present disclosure provided herein one skilled in the art can design the optical-elements in accordance with the present disclosure. For example, one skilled in the art could design an optical-element describing the GRIN material by using commercially available optical design software, such as ZEMAX available from the Zemax Corporation, of Belleview, Wash.

Those skilled in the art to which the present disclosure pertains will recognize that while above-described embodiments of the inventive optical-element and method of manufacture are exemplified using particular refractive profiles, GRIN Abbe-number profiles, and materials, others may be combined using these embodiments without departing from the spirit and scope of the present disclosure.

While some of the embodiments explained above and assume symmetry around the optical-axis, one skilled in the art will recognize that radial symmetry is not a requirement and cylindrical optical-elements can implemented with the disclosed techniques. While embodiments of the present disclosure are described above with respect to chromatic aberration, the disclosure is equally applicable to alternate optical-aberration correction. Further, the techniques described allow for a thermal design allowing the optical-element disclosed to correct for Temperature Coefficient of Refractive Index (dn/dT).

In summary, the present invention is described above in terms of particular embodiments. The invention, however, is not limited to the embodiments described and depicted herein. Rather, the invention is limited only by the claims appended hereto.

I claim:

1. An optical-dispersion corrected optical-element with a first and a second surface for imaging equal angle quadrilateral focal plane array (FPA), the optical-dispersion element comprising:
   a first nanocomposite-ink comprising a first nanofiller dispersed in a cured organic-matrix;
   a second nanocomposite-ink comprising a second nanofiller dispersed in the cured organic-matrix, wherein optical-dispersion of the second nanocomposite-ink is different than optical-dispersion of the first nanocomposite-ink, and distribution of the first nanocomposite-ink and second nanocomposite-ink corrects chromatic aberration; and
   wherein distribution of the first nanofiller and second nanofiller creates a volumetric cross-section with a radially asymmetric refractive gradient to correct optical aberration within the aspect ratio of an image plane array.

2. The optical-element of claim 1, wherein the aspect ratio of the image plane is 1:1, 4:3, or 16:9.

3. The optical-element of claim 1, wherein the concentration of nanoparticles through a cross section of the optical-element is described by orthogonal cross terms.

4. The optical-element of claim 3, wherein the radially asymmetric refractive gradient is described by high order mutually orthogonal polynomial terms.

5. The optical-element of claim 3, wherein the number of orthogonal cross terms change longitudinally along of the optical-axis of the optical-element.

6. The optical-element of claim 1, wherein the cross-section of the entire optical-element has the radially asymmetric refractive gradient.

7. The optical-element of claim 1, having a radially symmetric refractive gradient cross-section.

8. The optical-element of claim 1, wherein a volumetric cross-section has a refractive gradient that with an effective power opposite of the optical-elements overall power.

9. The optical-element of claim 1 wherein the first surface has curvature.

10. The optical-element of claim 1 wherein the first surface is freeform.

11. The optical-element of claim 9, wherein the first surface is toroidal.

12. The optical-element of claim 1, wherein the first surface and the second surface have surface curvature.

13. The optical-element of claim 1 wherein the shape of the lens matches the shape of the non-radial image array.

14. The optical-element of claim 1 with an f-number of f/1.4, f/2, f/4, or f/8.

15. The optical-element of claim 1, wherein the optical-element's intended use is for silicon devices.

16. The optical-element of claim 1, wherein the optical-element intended use is for InGaAs devices.

17. The optical-element of claim 1, wherein the optical-element operates in the visible spectrum.

18. The optical-element of claim 1, wherein the optical-element operates in the NIR, MIR, of FIR spectrum.

* * * * *